(No Model.)
T. GAUNT.
EVAPORATING APPARATUS.
No. 431,574. Patented July 8, 1890.
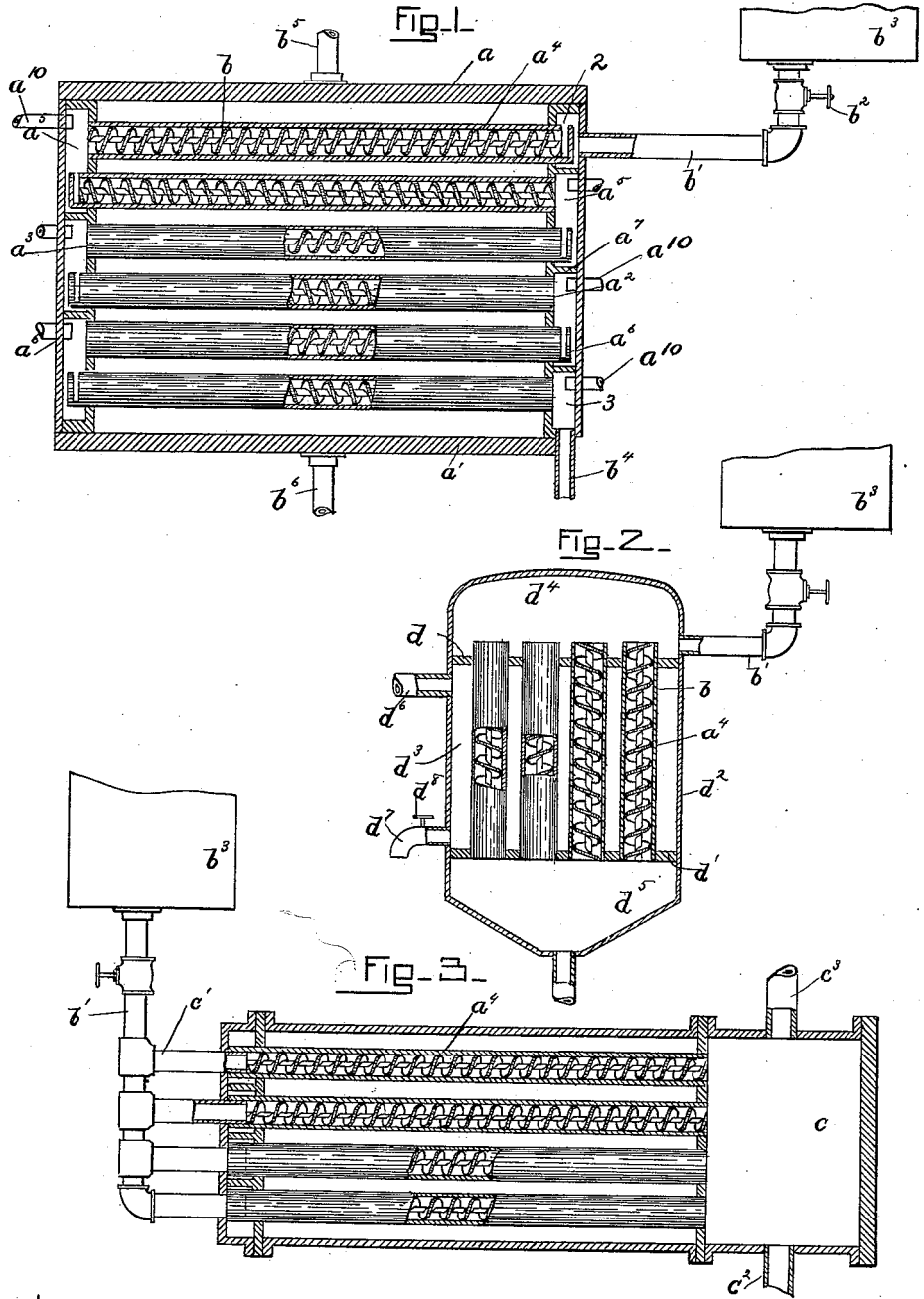
WITNESSES
INVENTOR
Thomas Gaunt,
by Crosby & Gregory
Attys

UNITED STATES PATENT OFFICE.

THOMAS GAUNT, OF BROOKLYN, NEW YORK.

EVAPORATING APPARATUS.

SPECIFICATION forming part of Letters Patent No. 431,574, dated July 8, 1890.

Application filed March 7, 1890. Serial No. 342,946. (No model.)

*To all whom it may concern:*

Be it known that I, THOMAS GAUNT, of Brooklyn, county of Kings, State of New York, have invented an Improvement in Evaporating Apparatus, of which the following description, in connection with the accompanying drawings, is a specification, like letters and figures on the drawings representing like parts.

This invention relates to evaporating apparatus of that class in which the liquor or other substance to be evaporated is passed through a heated hollow evaporating-surface, usually in the form of a tube or pipe.

My present invention has for its object to provide the said hollow evaporating-surface with means, as will be described, whereby the liquor on its passage through the hollow evaporating-surface is caused to come in contact with substantially the whole of the interior of the evaporating-surface, the said liquor on its passage through the evaporating-surface being given a rotary or rifle motion, whereby incrustation on the interior of the evaporating-surface is prevented or largely obviated.

My invention in an evaporator therefore consists, essentially, in the combination, with a hollow evaporating-surface, and a liquor-supply communicating with the interior of the said hollow evaporating-surface, of a stationary helix located within the said hollow evaporating-surface to impart a rotary or rifle motion to the liquor on its passage through the said hollow evaporating-surface, substantially as will be described.

Other features of my invention will be pointed out in the claims at the end of this specification.

Figure 1, in section and elevation, represents a sufficient portion of one form of an evaporator embodying my invention to enable it to be understood; Figs. 2 and 3, sectional views of modified forms of apparatus.

Referring to Fig. 1, the evaporator is shown as composed of an inclosing-case consisting of a top $a$, bottom $a'$, and ends $a^2$ $a^3$, the said ends supporting the hollow evaporating-surface, herein shown as horizontal tubes or pipes $a^4$, communicating with chambers $a^5$, formed by plates or covers $a^6$, secured to the ends $a^2$ $a^3$ in any suitable manner, the said chambers being separated from one another, as herein shown, by horizontal division-plates $a^7$, substantially as shown and described in United States Patent No. 409,572, granted to me August 20, 1889.

The horizontal tubes or pipes $a^4$, as shown in Fig. 1, are arranged in a vertical row, and each tube or pipe has placed within it a helix or screw $b$, fitted substantially liquid-tight into the said tube, the said helix being thus made stationary in the said tube.

One of the uppermost chambers $a^5$ on one side or end of the apparatus, and herein marked 2, has connected to it, as shown in Fig. 1, a liquid-supply pipe $b'$, provided with a suitable cock or valve $b^2$, and connected with a liquor-supply, herein shown as a tank $b^3$.

The uppermost tube or pipe $a^4$ has its end extended into the chamber 2, and preferably the said pipe is provided with a slot on its upper surface, through which the liquor admitted into the chamber 2 finds its way into the heating-tube. Preferably each tube of the evaporating-surface will have one end provided with a slot, as shown in Fig. 1. The lowermost chamber $a^5$, on the same side of the apparatus, as herein shown and marked 3, has connected to it, as herein shown, a liquid-discharge pipe $b^4$, through which the liquor concentrated in its passage through the evaporating-tubes may be discharged into a suitable receptacle, or it may be into the evaporating-surface of a second evaporator when two or more evaporators are connected together to form a multiple effect, substantially as shown in the patent referred to.

The evaporating-surface may be heated, as shown in Fig. 1, by steam or other agent admitted into the inclosing-case through a pipe $b^5$, it passing from the said case by means of a pipe $b^6$.

The liquor to be evaporated, and which is admitted into the evaporating-tubes in succession, as shown in Fig. 1, is caused to take a rotary or rifle motion or path by the screw $b$ on its passage through each evaporating-tube, and it will therefore be seen that the said liquor is brought in contact with substantially the entire interior surface of each evaporating-tube, so that a maximum evaporation is obtained with an apparatus of that class in which the evaporation is carried on within a tube or pipe. As the liquor passes through each evaporating-tube on its rotary path, it has a scouring or flushing action upon the interior of the tube, and thereby prevents or reduces to a minimum the formation of an incrustation, so that practically a clean evaporating-surface may be presented to the liquor being treated. The steam or vapor issuing from the evaporating-tubes may pass or escape from the chambers $a^5$ by means of steam or vapor outlet pipes $a^{10}$, which may and preferably will communicate with a common manifold. (Not shown.)

As shown in Fig. 1, the evaporating tubes or pipes are connected at their opposite ends so as to practically form a continuous coil; but I do not desire to limit my invention in this respect, as all the tubes or pipes may discharge into a common chamber or receptacle $c$, as shown in Fig. 3, wherein each pipe or tube $a^4$ is provided with a separate feed-pipe $c'$, connected to a main supply-pipe $b$, communicating with a liquor-supply $b^3$.

When constructed as shown in Fig. 3, the evaporating-tubes may be arranged out of line with each other after the manner of an ordinary tubular boiler.

In the apparatus shown in Fig. 3 the liquor, after passing through the evaporating tubes or pipes $a^4$, is discharged into the receptacle $c$, from whence it may pass by the liquor-outlet pipe $c^2$, the steam or vapor passing off from the receptacle $c$ by the pipe $c^3$.

In Figs. 1 and 3 I have shown the evaporating-surface as composed of horizontal tubes or pipes; but I do not desire to limit myself to this form of evaporating-surface, as my invention is equally well adapted to be used with vertically-arranged tubes or pipes, substantially as shown in Fig. 2, wherein the tubes or pipes $a^4$ are extended through and supported by suitable heads $d\ d'$, which form with the inclosing case $d^2$ a heating-chamber $d^3$. The tubes or pipes $a^4$, as herein shown, are extended above the head $d$ into a chamber $d^4$, with which communicates the liquor-inlet pipe $b'$, joined to a supply-tank $b^3$. Each evaporating tube or pipe $a^4$ is provided with a screw $b$, whereby liquor admitted into the chamber $b^4$ on its passage down through the tube is caused to take a rotary or rifle motion, it being discharged into a chamber $d^5$ below the head $d'$.

The evaporating-tubes may be heated, as shown in Fig. 2, by steam or other medium admitted into the heating-chamber $d^3$ by a pipe $d^6$, the water of condensation being permitted to flow off through a pipe $d^7$, provided with a suitable valve $d^8$.

The liquor on its passage through the vertical evaporating tubes or pipes is caused by the screw $b$ therein to come in contact with substantially the entire interior surface of the pipe and has a flushing action upon the same to prevent incrustation.

I have herein shown a single-effect evaporating apparatus; but I do not desire to limit myself in this respect, as two or more of the said apparatus may be coupled together to form a multiple effect.

I claim—

1. In an evaporator, the combination, with a hollow evaporating-surface and a liquor-supply communicating with the interior of the said hollow evaporating-surface, of a stationary helix located within the said hollow evaporating-surface to impart a rotary or rifle motion to the liquor on its passage through the said hollow evaporating-surface, substantially as described.

2. In an evaporator, the combination, with an evaporating-surface composed of tubes or pipes, and a liquor-supply communicating with the interior of the said tubes or pipes, of a stationary helix located within the said tubes to impart a rotary or rifle motion to the liquor on its passage through the said tubes, substantially as described.

3. The combination, with an evaporator consisting of an inclosing-case and an evaporating-surface therein composed of tubes or pipes, and a liquor-supply tank communicating with the said evaporating-tubes, of a stationary helix located in said tubes to impart a rotary or rifle motion to the liquor on its passage through the tubes, substantially as described.

In testimony whereof I have signed my name to this specification in the presence of two subscribing witnesses.

THOMAS GAUNT.

Witnesses:
JAS. H. CHURCHILL,
EMMA J. BENNETT.